United States Patent
Ying et al.

(10) Patent No.: US 7,808,978 B2
(45) Date of Patent: * Oct. 5, 2010

(54) VOICE OVER INTERNET PROTOCOL (VOIP) TELEPHONE APPARATUS AND COMMUNICATION SYSTEM FOR CARRYING VOIP TRAFFIC

(75) Inventors: Goangshiuan Shawn Ying, Oakland, CA (US); Eugene Edmon, Danville, CA (US); Steve M. Aspell, Brentwood, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/014,865

(22) Filed: Jan. 16, 2008

(65) Prior Publication Data

US 2008/0130633 A1    Jun. 5, 2008

Related U.S. Application Data

(63) Continuation of application No. 10/766,534, filed on Jan. 28, 2004, now Pat. No. 7,342,920.

(51) Int. Cl.
*H04L 12/66* (2006.01)
(52) U.S. Cl. ....................... 370/352; 709/245
(58) Field of Classification Search ................. 370/352, 370/400; 709/245
See application file for complete search history.

(56) References Cited

U.S. PATENT DOCUMENTS

| | | | |
|---|---|---|---|
| 5,751,338 A | 5/1998 | Ludwig, Jr. | |
| 5,974,139 A | 10/1999 | McNamara et al. | |
| 5,987,061 A | 11/1999 | Chen | |
| 6,044,107 A | 3/2000 | Gatherer et al. | |
| 6,055,268 A | 4/2000 | Timm et al. | |
| 6,081,291 A | 6/2000 | Ludgwig, Jr. | |
| 6,292,559 B1 | 9/2001 | Gaikwad et al. | |
| 6,317,495 B1 | 11/2001 | Gaikwad et al. | |
| 6,424,657 B1 | 7/2002 | Voit et al. | |
| 6,466,088 B1 | 10/2002 | Rezvani et al. | |
| 6,467,092 B1 | 10/2002 | Geile et al. | |
| 6,477,238 B1 | 11/2002 | Schneider et al. | |
| 6,498,791 B2 | 12/2002 | Pickett et al. | |
| 6,507,606 B2 | 1/2003 | Shenoi et al. | |
| 6,532,277 B2 | 3/2003 | Ulanskas et al. | |

(Continued)

OTHER PUBLICATIONS

International Telecommunications Union, "Series G: Transmission Systems and Media Digital Systems and Networks. Digital Sections and Digital Line System-Access Networks. Asymetric Digitial Subscriber Line (ADSL) Transceivers—2(ADLS2)," G.992.3, ITU-T. Jul. 2002, pp. 1-127.

(Continued)

*Primary Examiner*—Creighton Smith
(74) *Attorney, Agent, or Firm*—Toler Law Group

(57) ABSTRACT

A method of establishing Voice over Internet Protocol (VoIP) communications is provided. The method includes establishing a virtual circuit to carry VoIP traffic via a first Point to Point Protocol over Ethernet (PPPoE) session and to carry other data traffic via a second PPPoE session. The first PPPoE session and the second PPPoE session are supported by a digital subscriber line access multiplexer (DSLAM).

16 Claims, 5 Drawing Sheets

U.S. PATENT DOCUMENTS

| | | |
|---|---|---|
| 6,538,451 B1 | 3/2003 | Galli et al. |
| 6,549,568 B1 | 4/2003 | Bingel |
| 6,570,855 B1 | 5/2003 | Kung et al. |
| 6,597,689 B1 | 7/2003 | Chiu et al. |
| 6,608,835 B2 | 8/2003 | Geile et al. |
| 6,614,781 B1 | 9/2003 | Elliott et al. |
| 6,625,255 B1 | 9/2003 | Green et al. |
| 6,640,239 B1 | 10/2003 | Gidwani |
| 6,643,266 B1 | 11/2003 | Pugaczewski |
| 6,658,052 B2 | 12/2003 | Krinsky et al. |
| 6,667,971 B1 | 12/2003 | Modarressi et al. |
| 6,668,041 B2 | 12/2003 | Kamali et al. |
| 6,674,725 B2 | 1/2004 | Nabkel et al. |
| 6,674,749 B1 | 1/2004 | Mattathil |
| 6,680,940 B1 | 1/2004 | Lewin et al. |
| 6,697,768 B2 | 2/2004 | Jones et al. |
| 6,700,927 B1 | 3/2004 | Esliger et al. |
| 6,724,859 B1 | 4/2004 | Galli |
| 6,728,238 B1 | 4/2004 | Long et al. |
| 6,731,678 B1 | 5/2004 | White et al. |
| 6,735,601 B1 | 5/2004 | Subrahmanyam |
| 6,751,218 B1 | 6/2004 | Hagirahim et al. |
| 6,751,315 B1 | 6/2004 | Liu et al. |
| 6,751,662 B1 | 6/2004 | Natarajan et al. |
| 6,754,283 B1 | 6/2004 | Li |
| 6,762,992 B1 | 7/2004 | Lemieux |
| 6,763,025 B2 | 7/2004 | Leatherbury et al. |
| 6,765,864 B1 | 7/2004 | Natarajan et al. |
| 6,765,918 B1 | 7/2004 | Dixon et al. |
| 6,769,000 B1 | 7/2004 | Akhtar et al. |
| 6,769,024 B1 | 7/2004 | Natarajan et al. |
| 6,771,673 B1 | 8/2004 | Baum et al. |
| 6,775,232 B1 | 8/2004 | Ah Sue et al. |
| 6,775,267 B1 | 8/2004 | Kung et al. |
| 6,775,268 B1 | 8/2004 | Wang et al. |
| 6,775,273 B1 | 8/2004 | Kung et al. |
| 6,778,525 B1 | 8/2004 | Baum et al. |
| 6,782,082 B2 | 8/2004 | Rahamim |
| 6,891,825 B1 | 5/2005 | O'Dell et al. |
| 7,127,049 B2 * | 10/2006 | Godse et al. ............. 379/93.28 |
| 7,167,923 B2 | 1/2007 | Lo |
| 7,263,557 B2 | 8/2007 | Lund et al. |
| 2003/0103492 A1 * | 6/2003 | Tanimoto .................... 370/351 |
| 2004/0095921 A1 | 5/2004 | Kerpez |
| 2005/0002335 A1 | 1/2005 | Adamczyk et al. |
| 2005/0152370 A1 | 7/2005 | Meehan et al. |

OTHER PUBLICATIONS

International Search Report and Written Opinion of the Internatinoal Searching Authority for International Application No. PCT/US04/41341, Mailed on Feb. 27, 2006.

* cited by examiner

US 7,808,978 B2

VOICE OVER INTERNET PROTOCOL (VOIP) TELEPHONE APPARATUS AND COMMUNICATION SYSTEM FOR CARRYING VOIP TRAFFIC

CLAIM OF PRIORITY

The present application is a continuation application of and claims priority to U.S. patent application Ser. No. 10/766,534 filed on Jan. 28, 2004. The content of U.S. patent application Ser. No. 10/766,534 is expressly incorporated herein by reference in its entirety.

FIELD OF THE DISCLOSURE

The present disclosure relates generally to a voice over internet protocol (VoIP) telephone apparatus and to communication systems for carrying VoIP traffic.

BACKGROUND

Point-to-Point Protocol over Ethernet (PPPoE), has been widely used as the Internet protocol for ADSL broadband deployment. As providers deploy ADSL service, they often prefer supporting PPP-style authentication and authorization over a large installed base of legacy bridging customer premises (CPE). PPPoE provides the ability to connect a network of hosts over a simple bridging access device to a remote access concentrator or aggregation concentrator. With this model, each host uses its own PPPoE stack, presenting the user with a familiar user interface. Access control, billing, and type of service can be handled on a per user basis, rather than a per site basis.

Internet Protocol (IP) phones have been used to provide Voice over Internet Protocol (VoIP) service to the business enterprise environment. Typically, a VoIP phone set connects to the corporate data network through Ethernet connection and to a voice enabled router in the corporation. Traditionally, the IP parameters for the VoIP phone are statically assigned by the network administrator, or dynamically assigned through DHCP within the corporate network. With increasing attraction of VoIP application in the telecommunication community, the deployment of VoIP phones at a consumer broadband subscriber's location to provide additional phone service has started getting much attention with broadband service providers.

Maintaining Toll Quality of a VoIP service requires detailed planning of the VoIP network. Network delay and network jitter affect voice quality greatly. Several existing consumer VoIP deployments, such as Net2Phone Voice Service and Vonage VoIP Service, utilize the existing broadband access as the transport channel for the VoIP service. The quality of these voice services can be degraded due to network congestion. In the existing deployment model, the device which enables VoIP service in the customer premises relies on other devices on the LAN to initiate a PPPoE session, usually a home gateway or a PC. The particular LAN configuration can also have great impact on the voice quality.

Accordingly, there is a need for an improved VoIP telephone and communication system for communicating VoIP traffic.

DETAILED DESCRIPTION

The present disclosure is generally directed to a voice over internet protocol (VoIP) telephone apparatus and a communication system for carrying VoIP traffic. In a particular embodiment, a digital subscriber line access multiplexer (DSLAM) is adapted to route Voice over Internet Protocol (VoIP) traffic to an access router of a VoIP service provider network via a first virtual circuit and route data other than the VoIP traffic to a broadband remote access server (BRAS) via a second virtual circuit.

In another embodiment, an Internet Protocol (IP) telephone device includes a telephone keypad and a Point-to-Point Protocol over Ethernet (PPPoE) client module. The PPPoE client module is adapted to initiate a PPPoE session to communicate a VoIP telephone call, where the PPPoE session remains active until an input is received via the telephone keypad to disconnect the PPPoE session.

In another embodiment, a method of establishing Voice over Internet Protocol (VoIP) communications includes establishing a virtual circuit to carry VoIP traffic via a first Point-to-Point Protocol over Ethernet (PPPoE) session and to carry other data traffic via a second PPPoE session. The first PPPoE session and the second PPPoE session are supported by a digital subscriber line access multiplexer (DSLAM).

In another embodiment, a method of establishing Voice over Internet Protocol (VoIP) communications includes receiving a selection of a protocol at an Internet Protocol (IP) telephone device. The protocol is one of a plurality of protocols adapted to establish a VoIP telephone call session via the IP telephone device.

In another embodiment, a method of establishing Voice over Internet Protocol (VoIP) communications includes establishing a virtual circuit at an access router of a service provider network with an Internet Protocol (IP) telephone device. The virtual circuit is dedicated to carrying VoIP traffic between the IP telephone device and the service provider network and the virtual circuit does not include a network element that is coupled directly to a public IP network.

Figure 1:
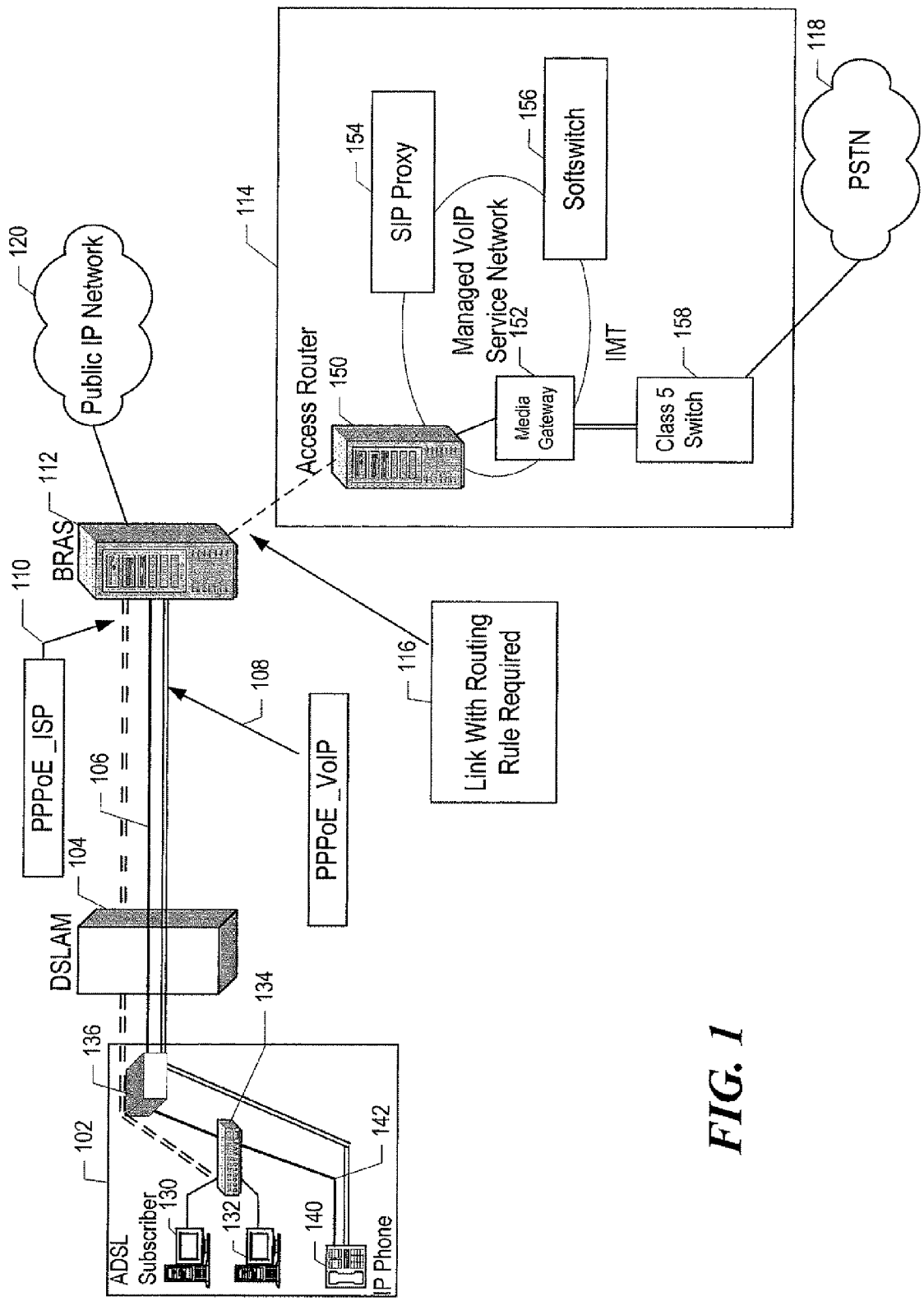
FIG. 1 is general diagram that illustrates a first embodiment of a system for carrying voice over internet protocol (VoIP) traffic.

Referring to FIG. 1 a communication system for carrying data traffic including VoIP traffic is shown. The system includes a representative broadband data subscriber 102, a digital subscriber line access multiplexer (DSLAM) 104, a broadband remote access server (BRAS) 112 coupled to the public internet 120, and a VoIP service provider network 114 coupled to the public switched telephone network 118.

The broadband subscriber 102 includes customer premises equipment, such as a first illustrative computer 130, a second illustrative computer 132, an Ethernet switch 134, and an internet protocol (IP) telephone device 140. The IP telephone device 140 is coupled via a data connection 142 to the Ethernet switch 134. The Ethernet switch 134 and the IP phone 140 are each separately coupled to a modem 136, such as an asynchronous digital subscriber line (ADSL) modem that is supported by the DSLAM 104.

The managed VoIP service provider network 114 as shown includes an access router 150, a media gateway 152, a Session Initiation Protocol (SIP) proxy server 154, a software switch 156, and a physical class 5 telephone switch 158. The class 5 telephone switch 158 is tied to the PSI 118. In this particular illustrated embodiment, a virtual circuit 106 is connected to the BRAS 112. The virtual circuit 106 provides communications support for a first point to point protocol over Ethernet (PPPoE) session 108 and a second PPPoE session 110. The first PPPoE session is dedicated for carrying VoIP traffic, such as VoIP traffic that originates from or is destined for the IP telephone device 140. The second PPPoE session carries other types of data that is communicated with the Ethernet switch 134. Since both VoIP data and other types of data are carried over the same virtual circuit 106, the BRAS is used to direct the VoIP traffic to the access router 150 over the link 116.

The link 116 is configured using policy based routing to move the VoIP traffic to the access router 150 while other data is routed to the public IP network 120. Thus, the link 116 is a dedicated VoIP connection and can be configured with a higher degree of quality of service using the VoIP service provider network 114 to establish improved transmission for carrying voice data and voice calls. Also, while equipment for only a single representative broadband subscriber is shown in FIG. 1 it should be understood that the system shown can support VoIP traffic from many different users of IP telephone devices and that the VoIP service network can handle many different calls concurrently.

Figure 2:
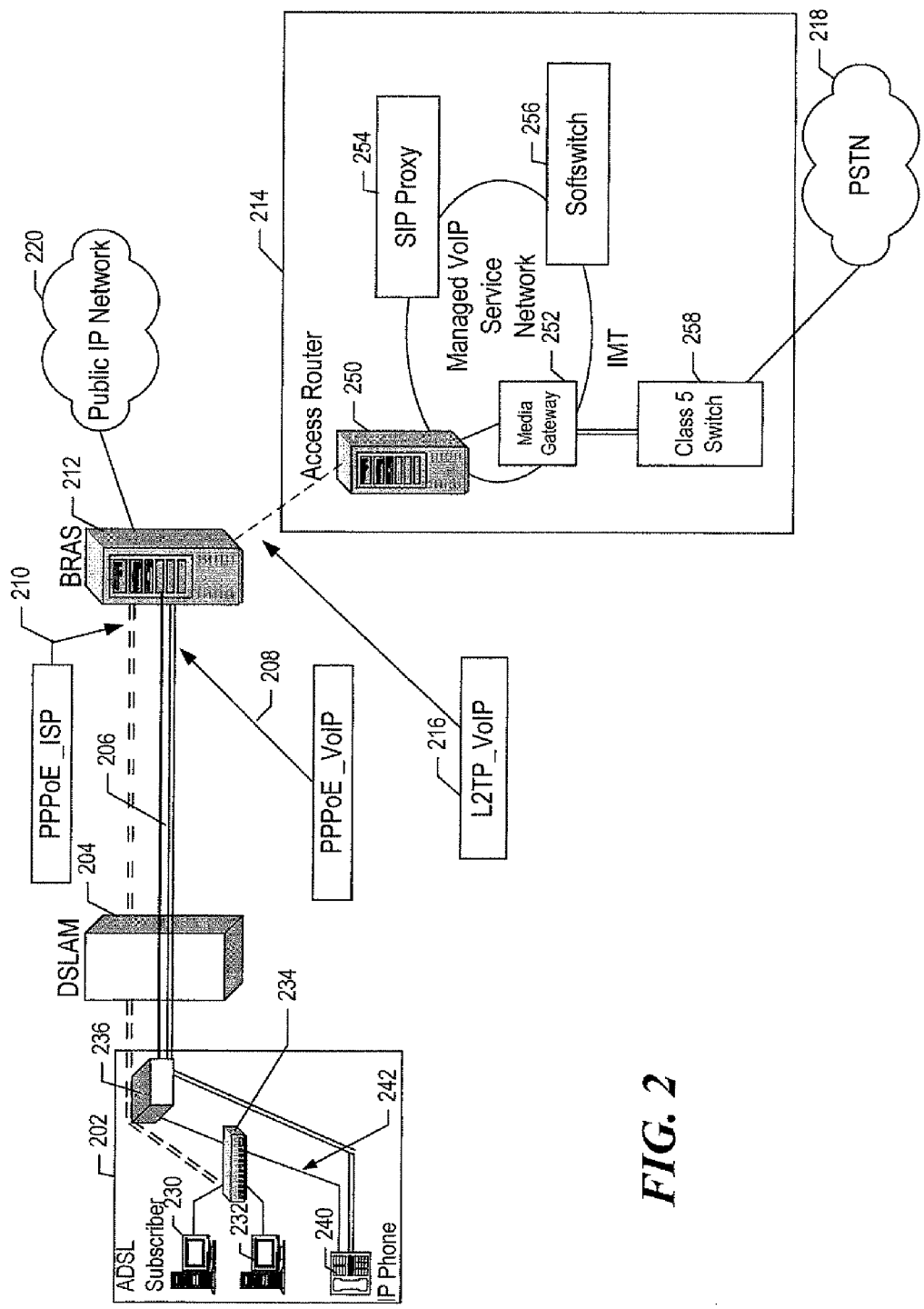
FIG. 2 is a general diagram that illustrates a second embodiment of a system for carrying voice over internet protocol (VoIP) traffic.

Referring to FIG. 2 another embodiment of a communication system for carrying data traffic including VoIP traffic is shown. The system includes a representative broadband data subscriber 202, a digital subscriber line access multiplexer (DSLAM) 204, a broadband remote access server (BRAS) 212 coupled to the public internet 220, and a VoIP service provider network 214 coupled to the public switched telephone network 218.

The broadband subscriber 202 includes customer premises equipment, such as a first illustrative computer 230, a second illustrative computer 232, an Ethernet switch 234, and an internet protocol (IP) telephone device 240. The IP telephone device 240 is coupled via a data connection 242 to the Ethernet switch 234. The Ethernet switch 234 and the IP phone 240 are each separately coupled to a modem 236, such as an asynchronous digital subscriber line (ADSL) modem that is supported by the DSLAM 204.

The managed VoIP service provider network 214 as shown includes an access router 250, a media gateway 252, a Session Initiation Protocol (SIP) proxy server 254, a software switch 256, and a physical class 5 telephone switch 258. The class 5 telephone switch 258 is tied to the PSTN 218. In this particular illustrated embodiment a virtual circuit 206 is connected to the BRAS 212. The virtual circuit 206 provides communications support for a first point to point protocol over Ethernet (PPPoE) session 208 and a second PPPoE session 210. The first PPPoE session is dedicated for carrying VoIP traffic, such as VoIP traffic that originates from or is destined for the IP telephone device 240. The second PPPoE session carries other types of data that is communicated with the Ethernet switch 234. In this particular embodiment, a dedicated layer two virtual tunnel is established between the BRAS 212 and the access router 250. The BRAS directs VoIP traffic to the access router 250 over the dedicated layer two virtual circuit tunnel 216.

Figure 3:
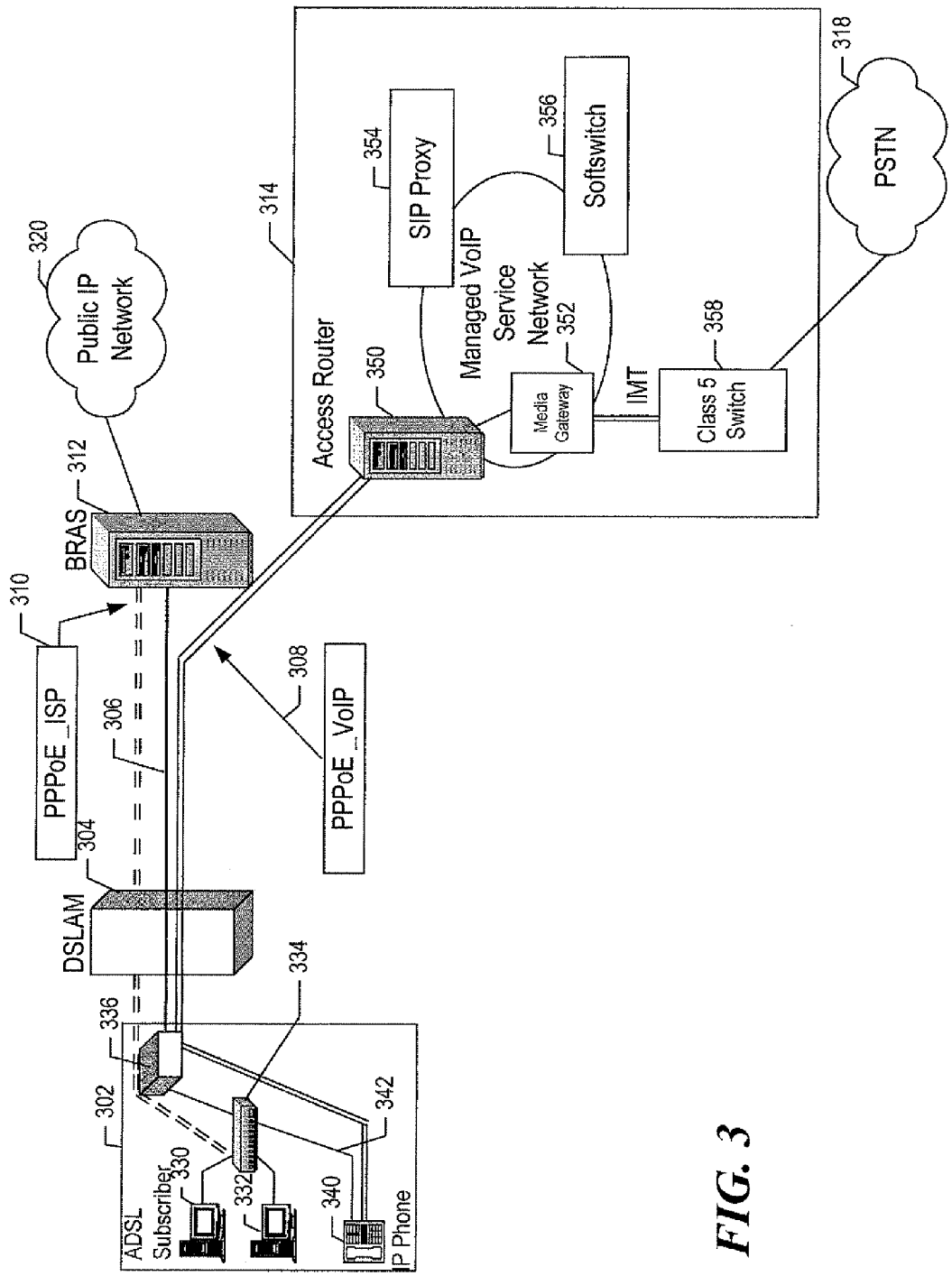
FIG. 3 is a general diagram that illustrates a third embodiment of a system for carrying voice over internet protocol (VoIP) traffic.

Referring to FIG. 3, another embodiment of a communication system for carrying data traffic including VoIP traffic is shown. The system includes a representative broadband data subscriber 302, a digital subscriber line access multiplexer (DSLAM) 304, a broadband remote access server (BRAS) 312 coupled to the public internet 320, and a VoIP service provider network 314 coupled to the public switched telephone network 318.

The broadband subscriber 302 includes customer premises equipment, such as a first illustrative computer 330, a second illustrative computer 332, an Ethernet switch 334, and an internet protocol (IP) telephone device 340. The IP telephone device 340 is coupled via a data connection 342 to the Ethernet switch 334. The Ethernet switch 334 and the IP phone 340 are each separately coupled to a modem 336, such as an asynchronous digital subscriber line (ADSL) modem that is supported by the DSLAM 104.

The managed VoIP service provider network 314 as shown includes an access router 350, a media gateway 352, a Session Initiation Protocol (SIP) proxy server 354, a software switch 356, and a physical class 5 telephone switch 358. The class 5 telephone switch 358 is tied to the PSTN 318. In this particular illustrative embodiment, a first virtual circuit 306 is connected to the BRAS 312 and a second virtual circuit 308 is connected to the access router 350. The first virtual circuit 306 provides communications support for a first point to point protocol over Ethernet (PPPoE) session 310. The second virtual circuit 308 is dedicated for carrying VoIP traffic, such as VoIP traffic that originates from or is destined for the IP telephone device 340. The first virtual circuit 306 carries other types of data that is communicated with the Ethernet switch 334 and the public IP network 320.

Figure 4:
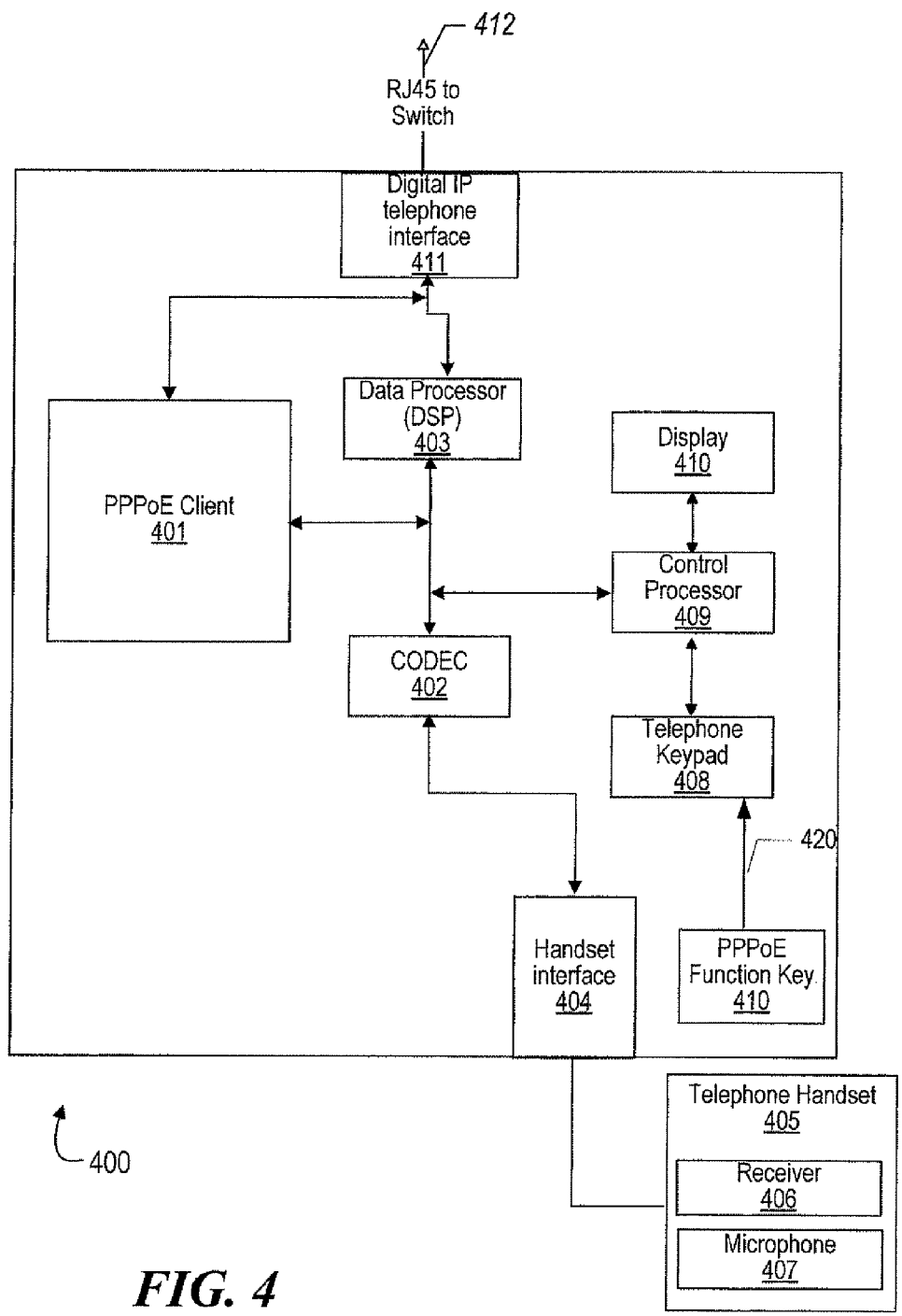
FIG. 4 is a block diagram that illustrates an embodiment of an internet protocol (IP) phone for use with the systems described with respect to FIGS. 1-3.

Referring to FIG. 4, a particular embodiment of an internet protocol (IP) telephone device is illustrated. The IP telephone includes a base portion 400 and a telephone handset portion 405. The telephone handset 405 is coupled to a handset interface 404. The base portion 400 includes a point-to-point protocol over Ethernet (PPPoE) client module 401, a data processor 403, an encoder and decoder unit 402, and a digital IP telephone interface 411. The base component 400 of the IP telephone also includes an optional display 410, control processor 409, and telephone keypad 408. The encoder and decoder module 402 is coupled to the data processor 403 and is also coupled to the handset interface 404 for receiving signals from the telephone handset 405. The PPPoE client 401 is coupled to the digital IP telephone interface 411, to the data processor 403, and to the CODEC 402 via an intermediate bus. The telephone handset 405 includes a voice communication receiver 406, a microphone 407, and a special purpose PPPoE function key 410. The PPPoE function key 410 may be used by a user to either launch or disconnect a PPPoE session for communicating voice over IP (VoIP) data.

In the event that a user desires to initiate a VoIP session using PPPoE, the user may press function key 410 and a PPPoE initiation signal 420 is then communicated to the control processor 409 through the telephone keypad 408. The PPPoE client 401 then initiates a PPPoE session that communicates the appropriate protocol signals to the digital IP telephone interface 411 which communicates to an Ethernet switch via the switch interface 412.

Once a PPPoE session has been established and voice over IP information has been communicated between the IP telephone and a remote device, the display 410 includes an indicator to illustrate that a PPPoE session has been established. To place particular calls via the IP telephone, a telephone keypad 408 has been made available. A user may enter address information on the telephone keypad to direct a destination for a voice over IP call. Also, after termination of a PPPoE connection, the indicator on the display 410 shows that the PPPoE session has been terminated, such as when either the far end disconnects or when a user depresses the PPPoE function key 410 to initiate disconnect sequence. While VoIP communication has been described with respect to PPPoE, it should be understood that the IP phone is configurable as to selection of protocols and other protocols, such as IP over Ethernet, may be used.

Figure 5:
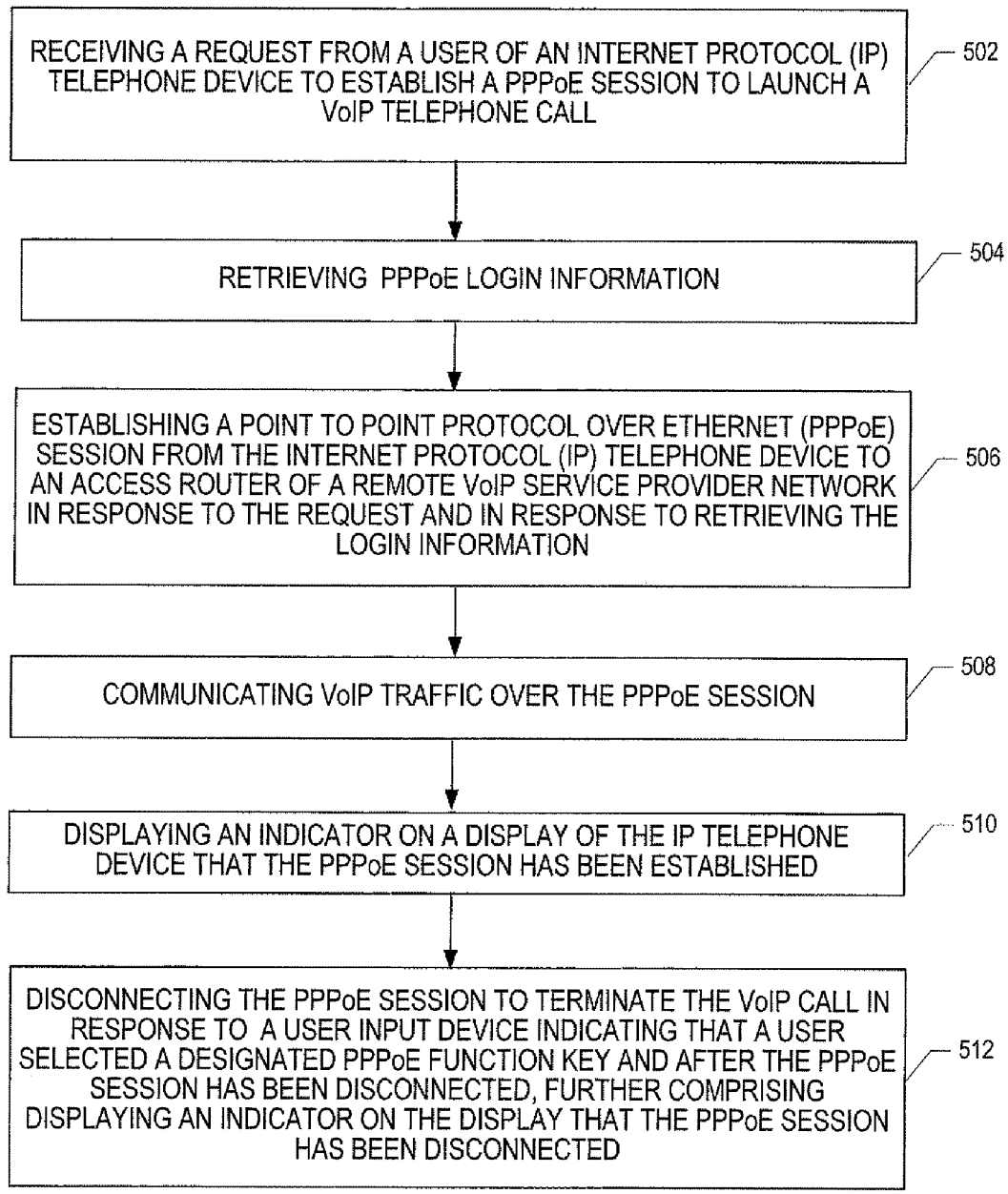
FIG. 5 is a flow chart that illustrates a method of communicating VoIP traffic between an IP phone and a managed VoIP service network.

Referring to FIG. 5, a flowchart of an illustrative method of operation of the systems described with respect to FIGS. 1 through 4 is shown. A request from a user is received at an internet protocol telephone device to establish a PPPoE session in order to launch a voice over IP (VoIP) telephone call, at step 502. PPPoE login information, such as user IDs and passwords are received, at 504. A PPPoE session is established from the IP telephone device to a remote access router of a remote VoIP service provider network in response to retrieving the login information from the user, as shown at step 506. After establishing the PPPoE session, VoIP traffic is then communicated over the PPPoE session, at 508. After the PPPoE session has been established, an indicator on a display of the IP telephone device shows that a PPPoE session has been established, at step 510.

The PPPoE session is controlled by the PPPoE function key to disconnect. In this case, the session can be on until a user initiates a disconnect command.

In a particular illustrative embodiment IP information may optionally be dynamically assigned to the IP telephone device from a remote VoIP service provider network during a PPPoE authentication stage prior to establishing the VoIP call. In this case, the PPPoE session is established in response to the dynamically assigned IP information received at the IP telephone device.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of establishing Voice over Internet Protocol (VoIP) communications, the method comprising:
    establishing a virtual circuit to carry VoIP traffic via a first Point-to-Point Protocol over Ethernet (PPPoE) session and to carry other data traffic via a second PPPoE session, wherein the first PPPoE session and the second PPPoE session are supported by a digital subscriber line access multiplexer (DSLAM).

2. The method of claim 1, wherein the virtual circuit is established by an Internet Protocol (IP) telephone device.

3. The method of claim 1, wherein the virtual circuit terminates at a broadband remote access server (BRAS).

4. A method of establishing Voice over Internet Protocol (VoIP) communications, the method comprising:
    establishing a virtual circuit at an access router of a service provider network with an Internet Protocol (IP) telephone device, wherein the virtual circuit is dedicated to carrying VoIP traffic between the IP telephone device and the service provider network and wherein the virtual circuit does not include a network element that is coupled directly to a public IP network.

5. The method of claim 4, wherein the service provider network is coupled to a broadband remote access server (BRAS) that is coupled to the public IP network.

6. The method of claim 5, further comprising communicating additional VoIP traffic via a connection between the service provider network and the BRAS.

7. The method of claim 6, wherein the additional VoIP traffic is associated with an additional IP telephone device.

8. A digital subscriber line access multiplexer (DSLAM) adapted to:
    route Voice over Internet Protocol (VoIP) traffic to an access router of a VoIP service provider network via a first virtual circuit; and
    route data other than the VoIP traffic to a broadband remote access server (BRAS) via a second virtual circuit.

9. The DSLAM of claim 8, further adapted to route additional VoIP traffic to the BRAS via a third virtual circuit, wherein the third virtual circuit is adapted to provide support for a first Point-to-Point Protocol over Ethernet (PPPoE) session dedicated to carrying the additional VoIP traffic and the third virtual circuit provides support for a second PPPoE session dedicated to carrying data other than the additional VoIP traffic.

10. The DSLAM of claim 9, wherein the VoIP traffic is associated with an Ethernet switch coupled to the DSLAM and the additional VoIP traffic is associated with an additional Ethernet switch coupled to the DSLAM.

11. The DSLAM of claim 8, wherein the first virtual circuit and the second virtual circuit are each adapted to support Point-to-Point Protocol over Ethernet sessions.

12. An Internet Protocol (IP) telephone device comprising:
    a telephone keypad; and
    a Point-to-Point Protocol over Ethernet (PPPoE) client module adapted to initiate a PPPoE session to communicate a VoIP telephone call;
    wherein the PPPoE session remains active until an input is received via the telephone keypad to disconnect the PPPoE session.

13. The IP telephone device of claim 12, further comprising a base portion and a telephone handset portion.

14. The IP telephone device of claim 13, wherein the base portion includes a handset interface coupled to the telephone handset portion.

15. The IP telephone device of claim 12, wherein the input is received via a PPPoE function key of the telephone keypad.

16. The IP telephone device of claim 12, wherein the telephone keypad is located on the base portion.

* * * * *